Feb. 19, 1952     L. G. FORSTER     2,586,462
MACHINE FOR CUTTING LENGTHS FROM
STRIPS OF THIN MATERIAL

Filed March 21, 1949     5 Sheets-Sheet 1

INVENTOR
Leslie Gordon Forster
BY Stevens, Davis, Miller & Mosher
his ATTORNEYS

Feb. 19, 1952   L. G. FORSTER   2,586,462
MACHINE FOR CUTTING LENGTHS FROM
STRIPS OF THIN MATERIAL
Filed March 21, 1949   5 Sheets-Sheet 2
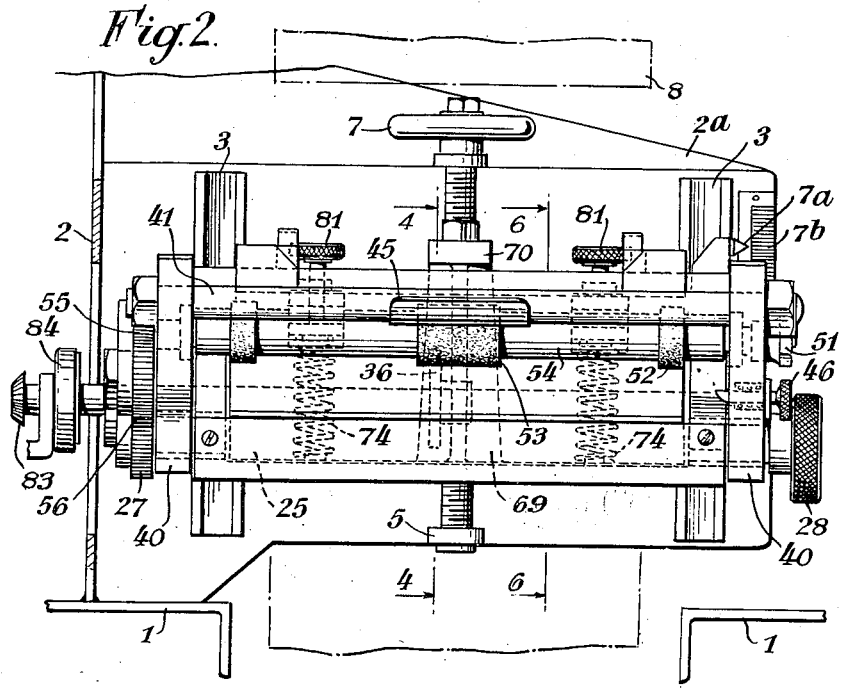
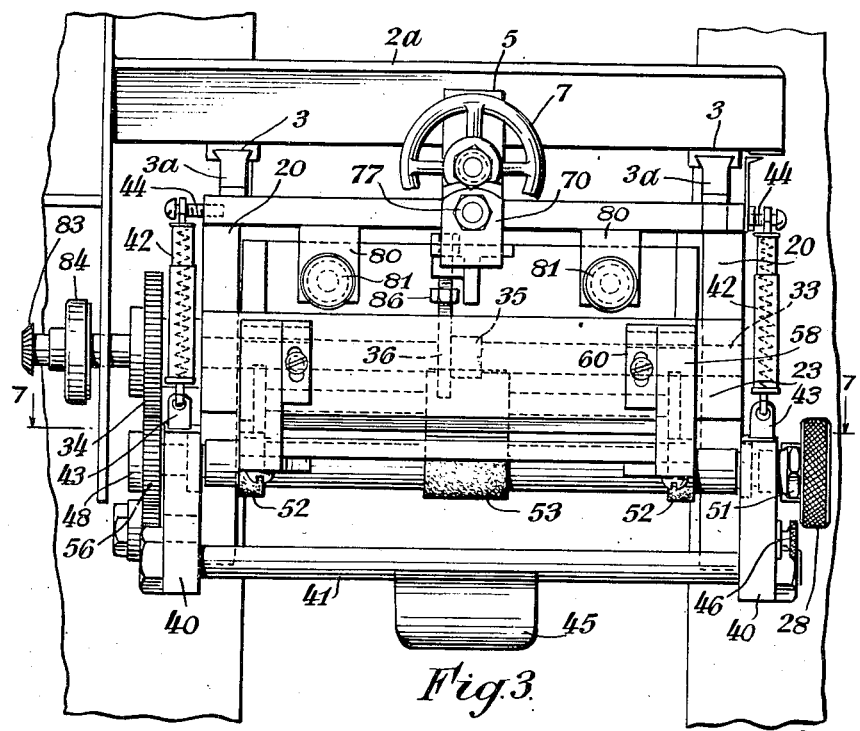
INVENTOR
Leslie Gordon Forster
BY Stevens, Davis, Miller & Mosher
his ATTORNEYS

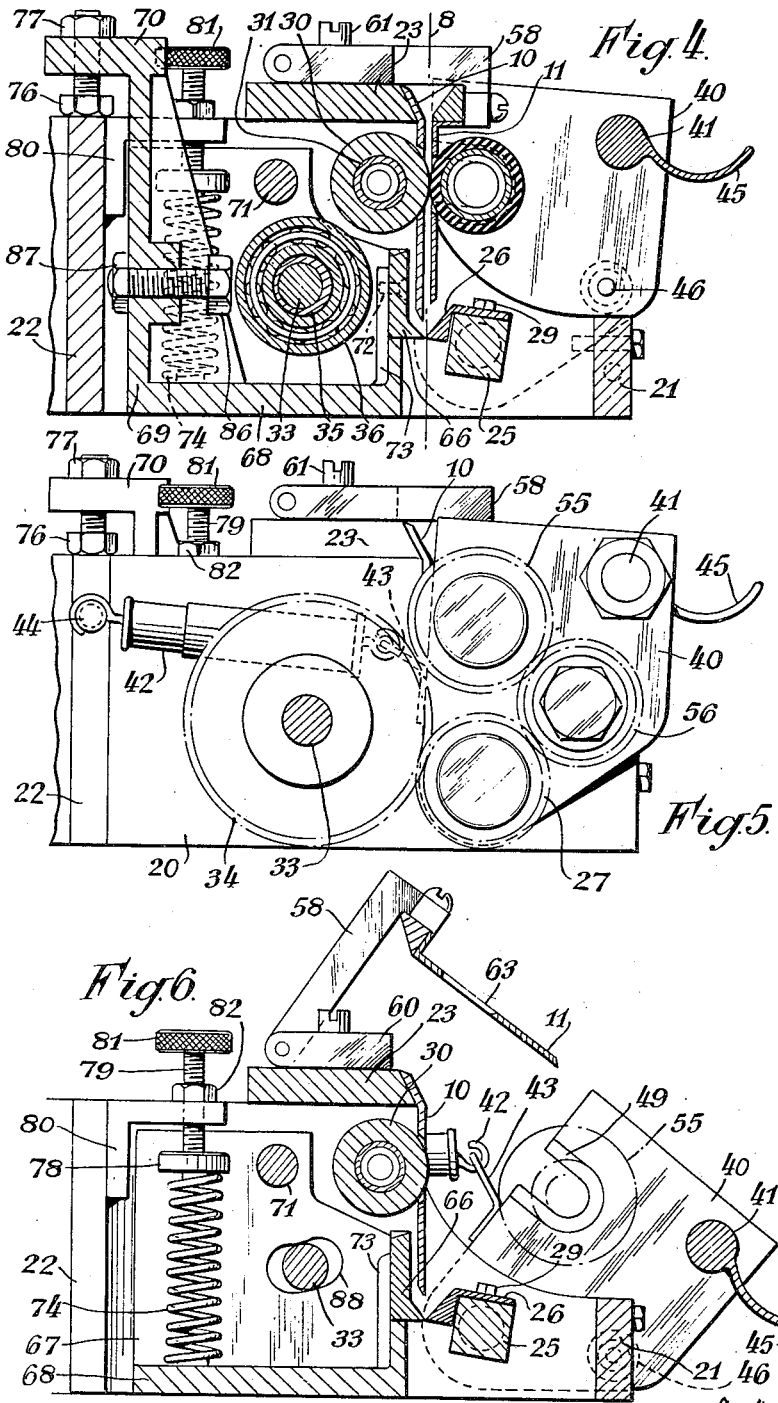

Feb. 19, 1952    L. G. FORSTER    2,586,462
MACHINE FOR CUTTING LENGTHS FROM
STRIPS OF THIN MATERIAL
Filed March 21, 1949    5 Sheets-Sheet 4
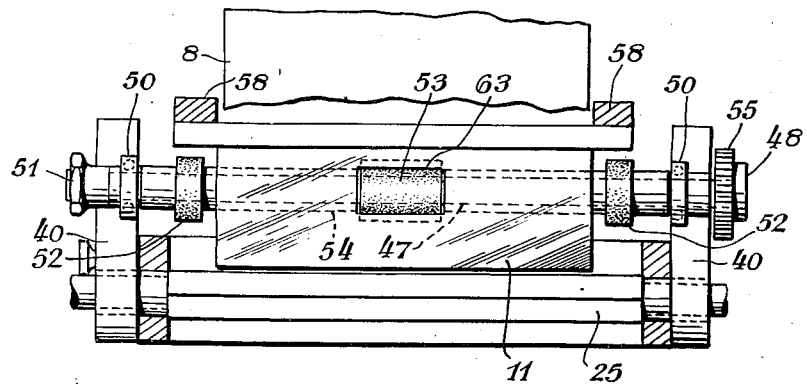
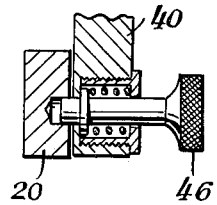
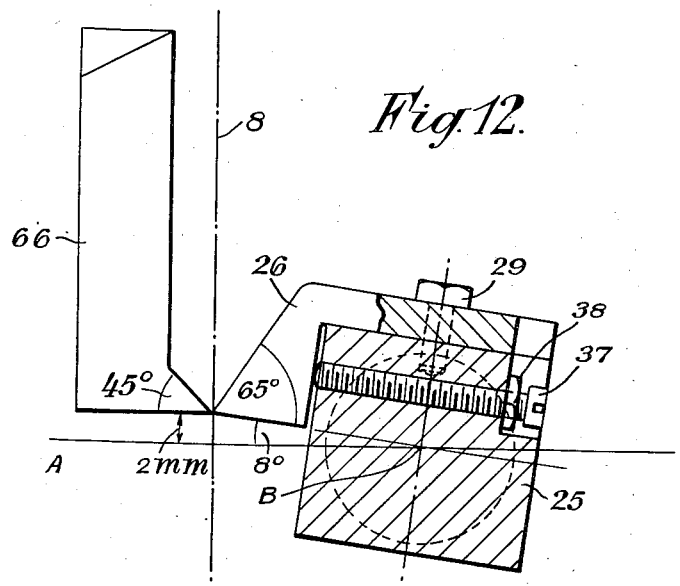
INVENTOR
Leslie Gordon Forster
BY Stevens, Davis, Miller & Mosher
his ATTORNEYS Feb. 19, 1952     L. G. FORSTER     2,586,462
MACHINE FOR CUTTING LENGTHS FROM
STRIPS OF THIN MATERIAL
Filed March 21, 1949     5 Sheets-Sheet 5
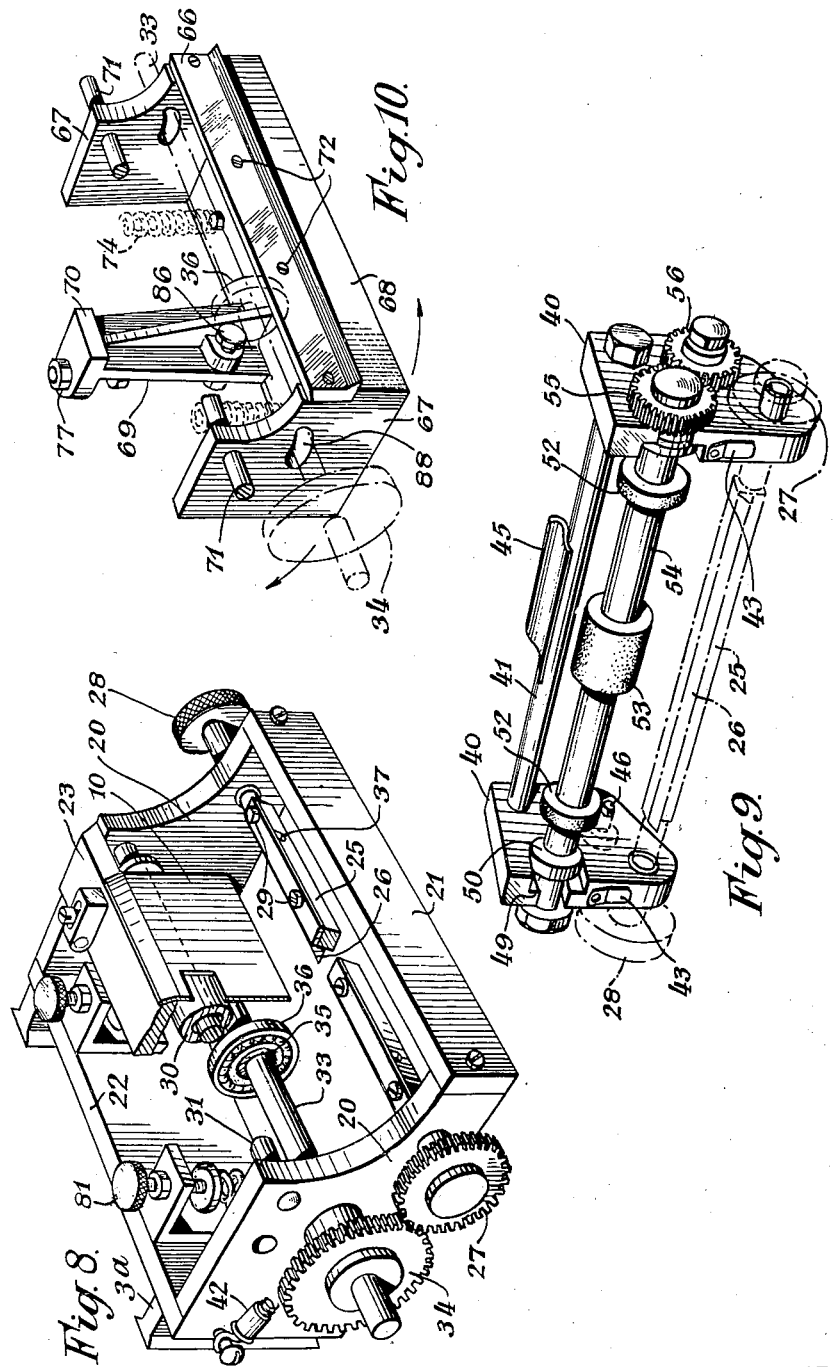
INVENTOR
Leslie Gordon Forster
BY Stevens, Davis, Miller & Mosher
his ATTORNEYS Patented Feb. 19, 1952

2,586,462

UNITED STATES PATENT OFFICE 2,586,462

MACHINE FOR CUTTING LENGTHS FROM STRIPS OF THIN MATERIAL

Leslie Gordon Forster, Ealing, London, England

Application March 21, 1949, Serial No. 82,577
In Great Britain December 15, 1948

7 Claims. (Cl. 164—68)

This invention relates to a machine for cutting lengths from a long strip or roll of thin material such as paper, cellulose or the like, and refers generally to the arrangement, association and construction of several components for feeding the strip forward and for carrying out the cutting operation in an efficient manner.

More particularly the invention relates to machines in which a set of feed rollers with cooperating rings thereon is provided for feeding the strip towards the cutting elements and the length is then cut from the strip by a continuously rotating cutter cooperating with a reciprocating or oscillating cutter which is moved periodically into the operating cutting position.

The apparatus is comparatively light and compact and may be supported adjustably above a base, the severed lengths of material being fed downwards for use in connection with other operations to be carried out by apparatus supported by the base.

The machine includes a rotating cutter associated with and cooperating with a reciprocating cutter in the manner herein set forth, a non-driven feed roller, and a pivoted frame carrying an interchangeable driving feed roller having rubber driving elements of different diameter secured thereto or formed thereon.

This machine may, for example, be used to supply measured lengths of strip material for wrapping packages, the wrapping or conveyor or other mechanism being arranged on the base below the machine. It is, however, to be understood that the application of this machine for cutting off lengths of material is not limited to such an application.

It is an object of the invention to provide a machine of this type which is compact and light and is capable of rapid operation.

It is also an object of the invention to provide in such a machine co-operating cutting edges which are brought into position by resilient means to engage and sever the material only at the instant of cutting.

It is a further object of the invention so to relate the movements of the cutting edges of the two cutting members that their movements at the instant of cutting sever the material cleanly and sharply without exerting drag thereon.

It is another object of the invention to allow more than one revolution of a rotating cutter between cutting operations.

It is another object of the invention to move the material forward between the cutters by a rotating feed roller geared to run at the same speed as the rotating cutter.

It is another object of the invention to make the cutting operation dependent upon movement of a reciprocating cutter having a cutting edge co-operating with the cutting edge of the rotating cutter, whereby the material may be fed forward during one, two or more revolutions of the feed roller between cutting operations.

It is another object of the invention so to mount the feed roller that it may be readily removed and replaced by another of different diameter.

It is another object of the invention to operate a reciprocating cutter so that it is moved forward at the correct instant into its operative position by a rotating eccentric shaft, this shaft being geared to the rotating cutter by gearing which provides a one-to-one ratio between the two, or a ratio such that the rate of rotation of the rotating cutter is a multiple of that of the eccentric shaft.

In the embodiment of the invention shown by way of example in the accompanying drawings:

Figure 2 shows a front elevation as viewed from the left of Figure 1;

Figure 3 shows a plan with the drum and guiding pulley removed;

Figure 4 shows a section on the line 4—4 of Figure 2;

Figure 5 is an outside side view showing the gearing in chain lines;

Figure 6 is a section on the line 6—6 of Figure 2;

Figure 7 is a part section on the line 7—7 of Figure 3;

Figure 8 is a detached pictorial view showing the main frame of the apparatus and parts supported thereby;

Figure 9 is a detached pictorial view of the pivoted frame carrying the driving roller;

Figure 10 is a detached pictorial view of the swinging frame carrying the reciprocating cutter;

Figure 11 is a detail connected with the pivoted frame carrying the driving roller; and Figure 12 is a diagram showing the contours of the cutters.

Figure 1:
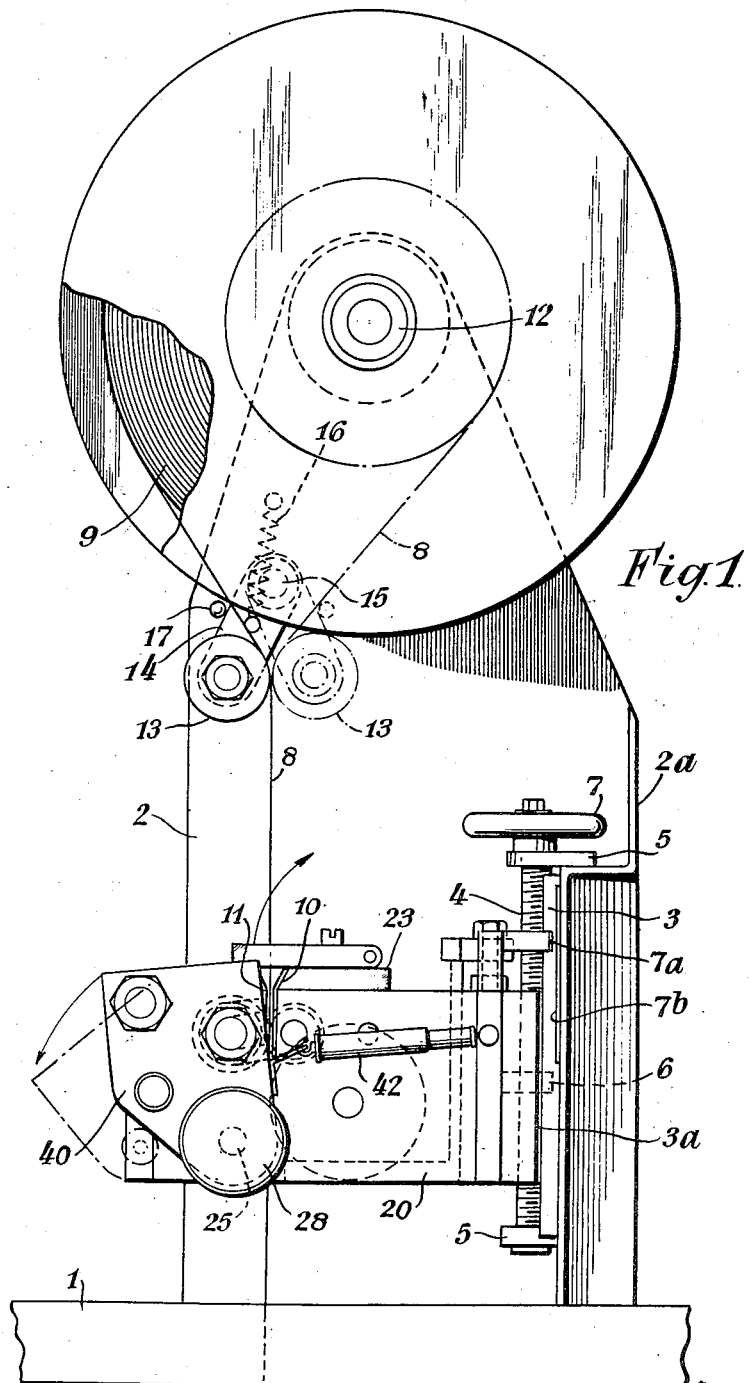
Figure 1 shows a general side view of the apparatus as mounted on a base member.

Referring first to the general arrangement shown in Figure 1, and the front elevation shown in Figure 2, the machine as a whole may be located above a base member 1 made in one or more parts and may be supported by a vertical framework 2 mounted on one of the base members at one side and overhanging the base in the manner shown, or alternatively bridging the gap between two base members 1.

The machine may be carried by an overhung extension 2a, as shown, or by a bridge member, the adjustable supporting means consisting, for example, of vertical guides 3 with an adjusting screw 4. The vertical guides may comprise two parallel dove-tail guides receiving corresponding members 3a on the frame of the machine. The adjusting screw 4 may be mounted in upper and lower bearings or brackets 5 on the frame extension 2a and engages a nut 6 on the frame of the machine. A hand wheel 7 may be used to rotate the screw to raise or lower the machine and a pointer 7a on the main frame moving over a scale 7b on extension 2a facilitates vertical adjustment. This raising and lowering apparatus forms no part of the invention and may be replaced by any equivalent adjustable supporting mechanism.

The strip 8 is unwound from a roll 9 and is fed downwards between sheet metal guides 10, 11 in the machine. Roll 9 is carried on bearings 12 at the upper end of the vertical support 2 and the material is fed past an adjustable swinging pulley 13, the roll being adjustable laterally on its bearings 12 to allow the strip to be fed down centrally through the machine.

The pulley is supported by a swinging arm 14 pivoted at 15 to the vertical frame, the arm being pulled towards one side or the other by the tension spring 16, so that it engages either stop 7 or stop 18. When the strip 8 is leaving the outer part of roll 9, guide pulley 13 is maintained in the left-hand position, but when the strip leaves the inner part of the roll, which is of smaller diameter, guide pulley 13 is moved to the right-hand position shown in chain dots. The roll is at the same time reversed so that it rotates when unwinding in the opposite direction. This has the effect in the right-hand position of bending strip 8 backwards as it passes over the guide roller sufficiently to counteract previous bending due to the material having been tightly wound on the inner or smaller diameter part of the roll. The direction of feed into the machine is substantially vertical for both positions of the guide roller. The strip is lightly braked when unwinding to prevent over-running and to obtain the above-mentioned reverse bending action by known means such as a reversible canvas band anchored at one end and weighted at the other. The band bears on the unwound part of the strip, the wrapping angle varying between about 100° and 45° depending upon the diameter of the unwound part of the roll.

Considering now the construction of the main frame of the machine, reference is made to Figures 3, 4, 5, 6 and 8. The frame comprises two side members 20 carrying bearings for most of the rotating shafts, a front transverse bar 21 and a back transverse plate 22. All these components may be made separately and welded together or some only may be so built up; the front transverse bar 21, for example, is shown bolted to the forward ends of the side members 20. The dove-tail or equivalent supporting elements 3a are secured to the back plate 22. Alternatively, all or most of the parts may be formed as a single casting of steel or other material. Secured on the upper part of the main frame is a cross piece 23 forming a support for a metal plate which constitutes the fixed guide members 10 for the strip 8.

Toward the forward end of the frame, the bearings for the shaft 25 carrying the rotating cutter 26 may be mounted. This shaft at one end carries a gear wheel 27 and at the other end a knurled disc 28 for facilitating hand rotation for adjustment. The intermediate part of the shaft 25 is preferably of square section and to this section is clamped, as by set bolts 29, the rotating cutter 26. The effective radius of the cutting edge may be adjusted by cheese head screws 37, one towards each end of the cutter. Lock nuts 38 are provided and the lock nuts and heads may be located in recesses in the shaft and in the adjacent edge of the cutter, or metal ring elements secured to or forming part of the cutter. The cutter rotates in a clockwise direction, as viewed in Figure 1, or anti-clockwise, as viewed in Figures 4 and 6.

The idle roller 30 forming one element of the strip feeding mechanism is supported by the side members 20 of the main frame. The idle roller may consist of a metal tube, the tube having towards its ends ball or other bearings mounted on the spindle 31, the ends of which are fixed in the side members 20. The ring elements co-operate with corresponding ring elements on the driving feed roller to be hereinafter described.

Mounted in the side members 20 of the main frame is a shaft 33 having secured thereon at one end a gear wheel 34 and carrying at some intermediate point, preferably at or towards the middle of its length, an eccentric 55 on which is mounted a radial ball bearing 36, this ball bearing being used in connection with the operation of the reciprocating cutter as will be described hereinafter.

The rocking frame carrying the rotatable feed roller is shown in Figures 2, 7 and 9. Two side members 40 are rigidly connected by a cross bar 41 and are pivotally supported on the outer end portions of the bushes in which the rotating cutter driving shaft 25 rotates. The bushes are fixed in but extend outside the main frame side members 20. The frame is biased towards its operative position by resilient tension elements 42 connected between brackets 43 on the edges of the side plates 40 of the rocking frame and pins 44 on the main frame. These tension elements may conveniently consist of tension or compression springs in telescopic tubes.

The rocking frame may be pulled backwards from its operative position against the resistance of the resilient element 42 by a curved plate 45 fixed on the cross bar 41, and when so withdrawn may be retained in position by a spring-controlled pin 46, shown also in Figure 11, carried on one of the side members 40 of the rocking frame and engaging a hole or recess in the corresponding side member 20 of the main frame.

The sides 40 of the frame are provided with open-ended slots or recesses 49 (see Figures 6 and 9) which serve for the support of the bearings of the driving roller shaft 47. The shaft is conveniently supported by ball bearings 50, each bearing entering the wider part of its slot. The outer race of the bearing engages the shoulder formed by the part of the slot of lesser width to prevent end movement, this narrower part of the slot being, however, of sufficient width to allow the passage of the outer ends of the shaft or of distance pieces thereon. The bearings 50 are held in position in the semi-circular ends of the slots by the resilient elements 42 when the rocking frame is in the operative position with the engaging surfaces of the driving roller engaging the idle roller.

The engaging surfaces of the driving roller consist of circular ring elements 52, 53 which may be of rubber bonded or otherwise secured to a tube 54 mounted on but spaced from shaft 47 by short sleeves at the ends. The shaft 47 may consist of a long bolt having at one end a head 48 and at the other end a nut 51, the tube 54, inner races of the ball bearings, gear wheel and distance pieces being thereby clamped together. The end rollers 52 engage the idle roller 30 towards the ends so as to be clear both of the guide plates 10, 11 and the strip 8 which is being fed between the rollers. The centre ring element 53 and the corresponding ring on the idle roller 30 grip the strip 8 between them. To assist in obtaining satisfactory operation, the two side ring elements 52 may be of slightly greater diameter than the central ring element 53, a difference of two thousandths of an inch diameter being usually sufficient so that the idle roller 30 may be driven from the driving roller outer ring elements 52, the intermediate ring elements being then separated by a gap less than the thickness of the strip 8, whereby the strip is driven on both sides thereof and does not form any part of the frictional driving connections between the driving and idle rollers. The driving roller shaft 47 at one end carries, and is driven by, a gear wheel 55 which is geared to the gear wheel 27 on the rotating cutter shaft 25 through an idle wheel 56 rotatably mounted on a spindle secured in one of the side members 40 of the rocking frame.

It will be seen that the rocking frame may be readily withdrawn from its operative position against the resistance of the resilient elements 42, the driving feed roller assembly being then removed and replaced by a similar assembly which may be identical in all respects with the exception of the diameter of the ring elements 52, 53. In this way the machine may be rapidly adjusted so as to cut off any required length from the strip.

When the rocking frame has been withdrawn the movable guide plate 11 may be swung clear, as shown in Figure 6. The plate 11 is carried by bars 58 pivoted at 59 to the cross piece 23 bridging the side members 20 of the main frame. The pivots 59 may be carried by members 60 secured by set bolts 61 to the cross piece 23.

To enable the central ring element 53 on the driving roller to engage the corresponding ring element on the idle roller 30, openings 62, 63 with bevelled edges, are cut in the fixed and movable guide plates 10, 11 respectively.

The swinging frame carrying the reciprocating cutter 66 is shown specially in Figures 4, 6 and 10 and comprises two end plates 67, a base member 68 and a vertical bracket 69 of tapered T-section having an extension 70 at the top integral therewith. All these elements may be bolted together or joined by welding or the frame may be a metal casting.

The swinging frame is mounted on a pivoted transverse shaft 71 carried in the side members 20 of the main frame. The reciprocating cutter 66 is secured firmly as by countersunk set screws 72 to the end plates 67 and to one or more upward extensions 73 of the base member 68 and is located against downward movement by registering with or engaging the upper edge of the front part of member 68; this is shown on Figures 4 and 6. Springs 74 bias the swinging frame so that the reciprocating cutter 66 tends to move towards the rotating cutter 26. This movement is limited, however, by an adjustable stop 76 introduced between the extension 70 at the upper end of the T-section bracket 69 forming part of the swinging frame and the back plate 22 of the main frame. This adjustable stop may conveniently consist of a bolt screwed into the extension and secured in position, when adjusted, by the lock nut 77. In this way, the forward position may be given a fine adjustment to ensure accurate co-operation with the operative edge of the rotating cutter 26. The springs 74 which bias the swinging frame towards its forward position engage between the base 68 of the swinging frame and adjustable stops 78 carried by screws 79 screwed through brackets 80 projecting forwardly from the back plate 22 of the main frame. The force exerted by the springs may be adjusted by the knurled heads 81 of the screws 79, lock nuts 82 being provided.

The swinging frame is held in its retracted position against the force exerted by the springs 74 during the greater part of the rotation of the rotating cutter 26. This retracting means comprises an eccentric 35 mounted at or about the centre of shaft 33 which is carried in bearings in the side members 20 of the main frame. On the eccentric is mounted the inner race of the radial ball bearing 36, the race being a force fit on the eccentric and abutting against a shoulder. The outer race is adapted to engage an adjustable stop carried on the vertical T-section member 69 of the swinging frame. This adjustable stop may, for example, consist of a bolt 86 screwed into a boss forming part of the T-section member 69 and locked in position by a lock nut 87. The eccentric mechanism co-operating with this adjustable bolt 86 holds the swinging frame in a position such that the reciprocating cutter 66 is held clear of the rotating cutter 26 except when it is moved momentarily into the operating position when the cutting edge of the rotating cutter 26 moves past and engages the cutting edge of the reciprocating cutter 66.

The eccenric shaft 33 is shown geared to the driving shafts 25 in a 2 to 1 ratio by the gears 27, 34 so that the rotating cutter 26 operates only during alternate revolutions. The rotating cutter is geared to the driving roller shaft 47 in a 1 to 1 ratio so that the length of strip cut off for each cycle of operations is equal to twice the circumference of the ring element 53 on the driving roller.

It is obvious that the driving shaft and the eccentric shaft may be geared to rotate at the same speed, or that the driving shaft may rotate at some other multiple of the speed of the eccentric shaft.

When the driving roller of smallest diameter is in use, gear wheels 55, 34 on the ends of the driving roller shaft 47 and the eccentric shaft 35 respectively will mesh with one another. This is not essential for operation but incidentally enables the machine to be made as compact as possible. The introduction of the idle gear wheel 56 between gear wheels 27, 55 ensures correct direction of rotation.

Shaft 33 passes through slots 88 in the side walls 67 of the swinging frame, the slots being curved and elongated sufficiently to allow the necessary swinging movement.

The enlarged view, Figure 12, shows in one example of construction the direction of movement, when the cutting operation takes place, of the cutting edge of the rotating cutter 26 relatively to the direction in which the material is fed. The V edge of the non-rotating cutter may be regarded as an abutment supporting the strip and the V edge of the rotating cutter then moves past the V edge of the non-rotating cutter in such a direction that it is approaching the direction of feed of the material up to the instant of cutting and for a short interval thereafter; that is, the V edge of the rotating cutter has a component of movement transverse to the direction of feed of the material. It is found that the material is severed quickly and cleanly without any dragging or tearing after which it is gripped or guided by other means, not shown, for further operations.

To obtain the correct direction of movement of the V cutting edge of the rotating cutter 26 at the instant of cutting, the axis of its shaft 25 is located in a plane perpendicular to the direction of feed of the material and posterior to the non-rotating cutter as regards direction of feed. This relation may be defined in several ways. For example, the perpendicular distance between the V edge of the non-rotating cutter and the said plane may be given a definite dimension. In certain sizes of cutter a displacement in this direction of 2 or 3 millimetres is sufficient to achieve the purpose of the invention. Alternatively, the angle between the said plane and the radius from the axis of the rotation of the rotating cutter to the V edge of the non-rotating cutter might be specified. In most cases an angle of 8° is suitable. This angle is, of course, the same as the angle between the direction of feed of the material and the direction of movement of the V edge of the rotating cutter.

The cutters are backed off on both sides to form a V having a suitable angle. As a minimum requirement the apex of the V on the rotating cutter must be formed by faces which clear the material. This requirement only calls, however, for a more obtuse angle of the V than is generally convenient. It is desirable that the angle should be acute. Convenient angles are shown in Figure 2 in which the face on one side of the cutter is radial and that on the other side is at 65°. These angles are, however, given only by way of example.

The lower face of the non-rotating cutter could conveniently be perpendicular to the direction of the feed of the material and the upper face at an angle of 45° to the lower face. These angles also are given merely by way of example.

The rate of rotation of the rotating cutter and the feed roller and their effective diameters must always be such that the forward component of the rate of movement of the cutting edge in the direction of movement of the material is greater than the rate of feed of the material. This condition must be specified for the largest diameter of feed roller which can be used in the machine. Smaller diameters will give a greater difference of speed.

While the cutting edge of the non-rotating or reciprocating cutter 66 is generally parallel to the axis of the rotating cutter 26, the cutting edge of the rotating cutter departs slightly from parallelism. To cut correctly the edge on the rotating cutter should be of helical form, the helix being of very long pitch. For example, a difference of 1 mm. circumferentially between the two ends of the helical cutting edge is sufficient to obtain point-cutting contact as distinct from line-cutting contact.

The machine may be driven by a motor or by gearing indicated at 83 in Figures 2 and 3, preferably through a one-way clutch 84. The mechanism may thus be adjusted or may be fed by hand when the driving means is inoperative.

What I claim is:

1. A machine for cutting predetermined lengths from a long strip of thin material that comprises means for guiding and feeding the material into a rectilinear path, a rotating cutter extending transversely of the material on one side of the rectilinear path, a reciprocable cutter extending transversely of the material on the other side of said path opposite the rotating cutter, said cutter being reciprocable in a direction generally normal to said path, said cutters being positioned so as to normally be out of the rectilinear path of the thin material; means for synchronously rotating said rotating cutter and feeding the thin material, and operating connections between the rotating cutter and the reciprocating cutter for periodically moving the reciprocating cutter briefly into the path of the strip of thin material and into cooperation with the rotating cutter to cut a predetermined length of thin material.

2. A machine as defined in claim 1 further characterized in that the operating connections between the rotating cutter and the reciprocating cutter include cam means for holding the reciprocating cutter out of the path of the thin material except for the brief periods occurring not oftener than once during each rotation of the reciprocating cutter and in that resilient means are provided for resiliently urging the reciprocating cutter into the path of the thin material and in cooperation with the rotating cutter to cut a predetermined length of thin material.

3. A machine as defined in claim 1 further characterized in that the operating connections between the rotating cutter and the reciprocating cutter include an eccentric shaft means for holding the reciprocating cutter out of the path of the thin material except for the brief periods occurring not oftener than once during each rotation of the reciprocating cutter and in that resilient means are provided for resiliently urging the reciprocating cutter into the path of the thin material and in cooperation with the rotating cutter to cut a predetermined length of thin material.

4. A machine as defined in claim 1 in which the reciprocating cutter is resiliently urged toward the rotating cutter and has its upper or approach surface inclined so that the reciprocating cutter will yield rearwardly if engaged by the cutting edge of the rotating cutter.

5. A machine as defined in claim 1 in which the cutting edges of the rotating cutter and the movable cutter are slightly inclined to one another to obtain a cutting point that will move lengthwise of the cutters during the cutting interval.

6. A machine as defined in claim 1 in which fixed guide means are provided for confining the strip to a narrow rectilinear path as it passes between the cutters.

7. A machine as defined in claim 1 in which the operating connections between the rotating cutter and the reciprocating cutter includes a changeable ratio drive that can be changed to vary the periods between cuttings.

LESLIE GORDON FORSTER.

REFERENCES CITED

The following references are of record in the file of this patent:

UNITED STATES PATENTS

| Number | Name | Date |
|---|---|---|
| 488,129 | Mendenhall | Dec. 13, 1892 |
| 506,798 | Scott | Oct. 17, 1893 |
| 1,296,554 | Redington et al. | Mar. 4, 1919 |
| 1,632,378 | Lemer | June 14, 1927 |
| 1,653,129 | Taylor | Dec. 20, 1927 |
| 1,788,122 | Petersen | Jan. 6, 1931 |
| 1,948,796 | Muller | Feb. 27, 1934 |
| 2,076,969 | Sieger | Apr. 13, 1937 |
| 2,266,362 | Forster | Dec. 16, 1941 |

FOREIGN PATENTS

| Number | Country | Date |
|---|---|---|
| 287,583 | Germany | Jan. 24, 1914 |
| 375,092 | Germany | Jan. 13, 1922 |